June 29, 1937.  O. K. KASPEREIT  2,085,025
REFLECTING PRISM
Filed Nov. 14, 1935
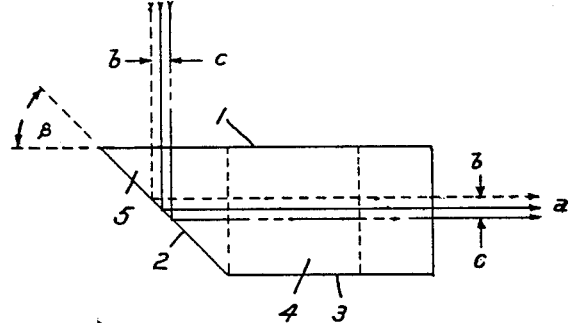
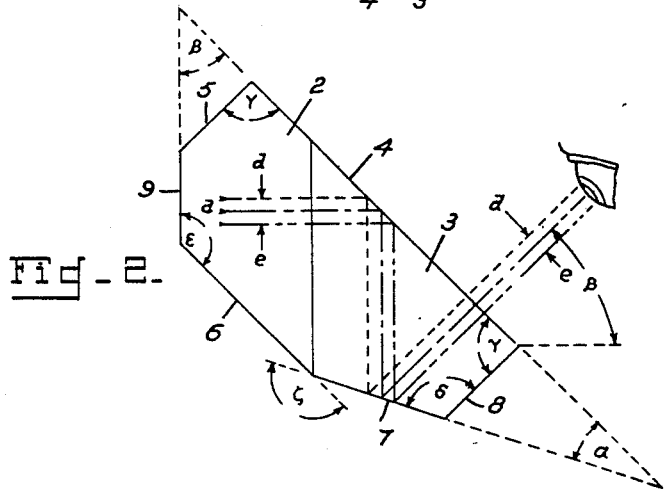
Inventor
Otto K. Kaspereit
By W. M. Roach
Attorney Patented June 29, 1937

2,085,025

UNITED STATES PATENT OFFICE 2,085,025

REFLECTING PRISM

Otto K. Kaspereit, Philadelphia, Pa.

Application November 14, 1935, Serial No. 49,746

1 Claim. (Cl. 88—1)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a reflecting prism suitable for use in optical instruments and intended primarily for use in a stereoscope.

The invention contemplates the provision of a one piece prism which will not invert the image.

With the foregoing and such other objects in view as may hereinafter more fully appear, the invention resides in the arrangement of parts set forth in the description and more particularly pointed out in the claim.

In the accompanying drawing in which a practical embodiment of the invention has been illustrated:

Fig. 1 is a plan view of the prism and

Fig. 2 is a view in side elevation.

Referring to the drawing by numerals of reference:—

In constructing the prism the angle alpha is 22° 30'; the angle beta is 45°; the angle gamma is 90°; the angle delta is 112° 30'; the angle epsilon is 135°; and the angle zeta 157° 30'.

The prism is formed with a plane side surface 1 a portion of which forms the entrant surface, and on the opposite side and at one end is a surface 2 making an angle of 45° with the surface 1 and a surface 3 parallel to the surface 1. The upper face of the prism, as viewed in Fig. 1, consists of a plane surface 4 disposed at an angle of 45° to the vertical, and a surface 5 at right angles to the surface 4. The bottom of the prism consists of a surface 6, a surface 7 disposed at an angle thereto, and a surface 8 extending from the surface 7 to the surface 4. At one end the prism has a vertical surface 9 extending from the surface 6 to the surface 5.

A portion of the surface 1 acts as an entrant face for the rays from an object to be observed, the rays passing to the surface 2 from which they are reflected to the surface 4. From the surface 4 the rays are reflected to the surface 7 which is silvered and reflects the rays back through the surface 4 to the eye of an observer.

From a consideration of the rays $a$, $b$ and $c$ in a horizontal plane it will be seen that the object is reverted in the passage of its rays through the prism; while a consideration of the rays $a$, $d$ and $e$ in the vertical plane makes it evident that the image is not inverted.

I claim:

A prism including an entrant face, a reflecting face disposed at an angle of 45° to the entrant face, a second reflecting face at an angle of 45° to the path of the rays reflected from the first reflecting face, a third reflecting face at an angle of 67° 30' to the path of the rays reflected from the second reflecting face, and an emergent face formed by a portion of the second reflecting face the plane of the second reflecting face forming an angle of 45° with the plane of the first reflecting face, and the plane of the third reflecting face forming angles of 157° 30' with the first reflecting face and 22° 30' with the second reflecting face, the initially entrant and finally emergent cone of rays lying in different planes.

OTTO K. KASPEREIT.